United States Patent
Presman et al.

(10) Patent No.: US 10,735,194 B2
(45) Date of Patent: Aug. 4, 2020

(54) VERIFIED DATA SETS

(71) Applicant: KIKKO LLC, Short Hills, NJ (US)

(72) Inventors: Ilya Presman, Short Hills, NJ (US); Serge Danilov, Brooklyn, NY (US)

(73) Assignee: KIKKO LLC, Short Hills, NJ (US)

( * ) Notice: Subject to any disclaimer, the term of this patent is extended or adjusted under 35 U.S.C. 154(b) by 286 days.

(21) Appl. No.: 15/850,598

(22) Filed: Dec. 21, 2017

(65) Prior Publication Data
US 2019/0199528 A1 Jun. 27, 2019

(51) Int. Cl.
| H04L 9/08 | (2006.01) |
| H04L 29/06 | (2006.01) |
| H04L 29/08 | (2006.01) |
| H04W 4/21 | (2018.01) |
| H04W 12/02 | (2009.01) |
| H04L 9/32 | (2006.01) |

(52) U.S. Cl.
CPC .............. *H04L 9/32* (2013.01); *H04L 9/0894* (2013.01); *H04L 9/3226* (2013.01); *H04L 63/126* (2013.01); *H04L 67/02* (2013.01); *H04L 67/306* (2013.01)

(58) Field of Classification Search
CPC .. G06Q 20/40; G06Q 20/401; G06Q 20/4014; G06Q 20/4016; H04L 63/126; H04L 9/32; H04L 9/0894; H04L 9/3226; H04L 63/0407; H04L 67/02; H04L 67/306; H04L 67/12; H04W 4/21; H04W 12/02
See application file for complete search history.

(56) References Cited

U.S. PATENT DOCUMENTS

| 2009/0043691 A1* | 2/2009 | Kasower ................ G06Q 20/10 705/39 |
| 2013/0198284 A1* | 8/2013 | Karri ..................... H04L 67/306 709/204 |
| 2013/0332342 A1* | 12/2013 | Kasower ................ G06Q 20/10 705/39 |
| 2015/0120679 A1* | 4/2015 | Borean ................. G06F 21/316 707/690 |
| 2017/0111358 A1* | 4/2017 | Hall ..................... H04L 63/0876 |
| 2018/0101900 A1* | 4/2018 | Jones-Mcfadden .... G06Q 40/02 |
| 2018/0288033 A1* | 10/2018 | Kamal .................... G06F 21/33 |
| 2018/0351832 A1* | 12/2018 | Coburn ............... H04L 41/5048 |

* cited by examiner

*Primary Examiner* — Alexander Lagor
*Assistant Examiner* — Vu V Tran
(74) *Attorney, Agent, or Firm* — Schwegman Lundberg & Woessner, P.A.

(57) ABSTRACT

Disclosed are systems, methods, and non-transitory computer-readable media for consuming, transforming and generating verified data sets. A verified data management system receives, from a client device, a request to generate a verified data set, and in response, accesses available verified data for a user associated with the client device. The verified data management system causes presentation of a listing of the available verified data on the client device and receives a selection of a subset of the available verified data to be included in the verified data set. The verified data management system generates the verified data set based on the subset of the available verified data and generates a unique identifier for the verified data set. The verified data management system provides the unique identifier to the client device, thereby enabling access of the verified data set.

19 Claims, 11 Drawing Sheets under pinned to US 10,735,194 B2

VERIFIED DATA SETS

TECHNICAL FIELD

An embodiment of the present subject matter relates generally to data management and, more specifically, to generating verified data sets.

BACKGROUND

With the increased use of the Internet, many interactions that were commonly performed in person are now performed online. For example, common tasks such as selling items, purchasing items, and even dating are often done over the Internet using online services. While these online services make performing these tasks easier and more convenient, they also come with an increased likelihood of fraud. For example, a user has no way of knowing whether the representations made in an online profile (e.g., pictures, reviews, etc.) are truthful or fabricated. One solution is to require verification of each user account (e.g., background checks, personal information, etc.); however, this leads to a related problem of data security and privacy. Common verification techniques rely on a user providing personal information; however, a user may not want to share this information due to security concerns. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
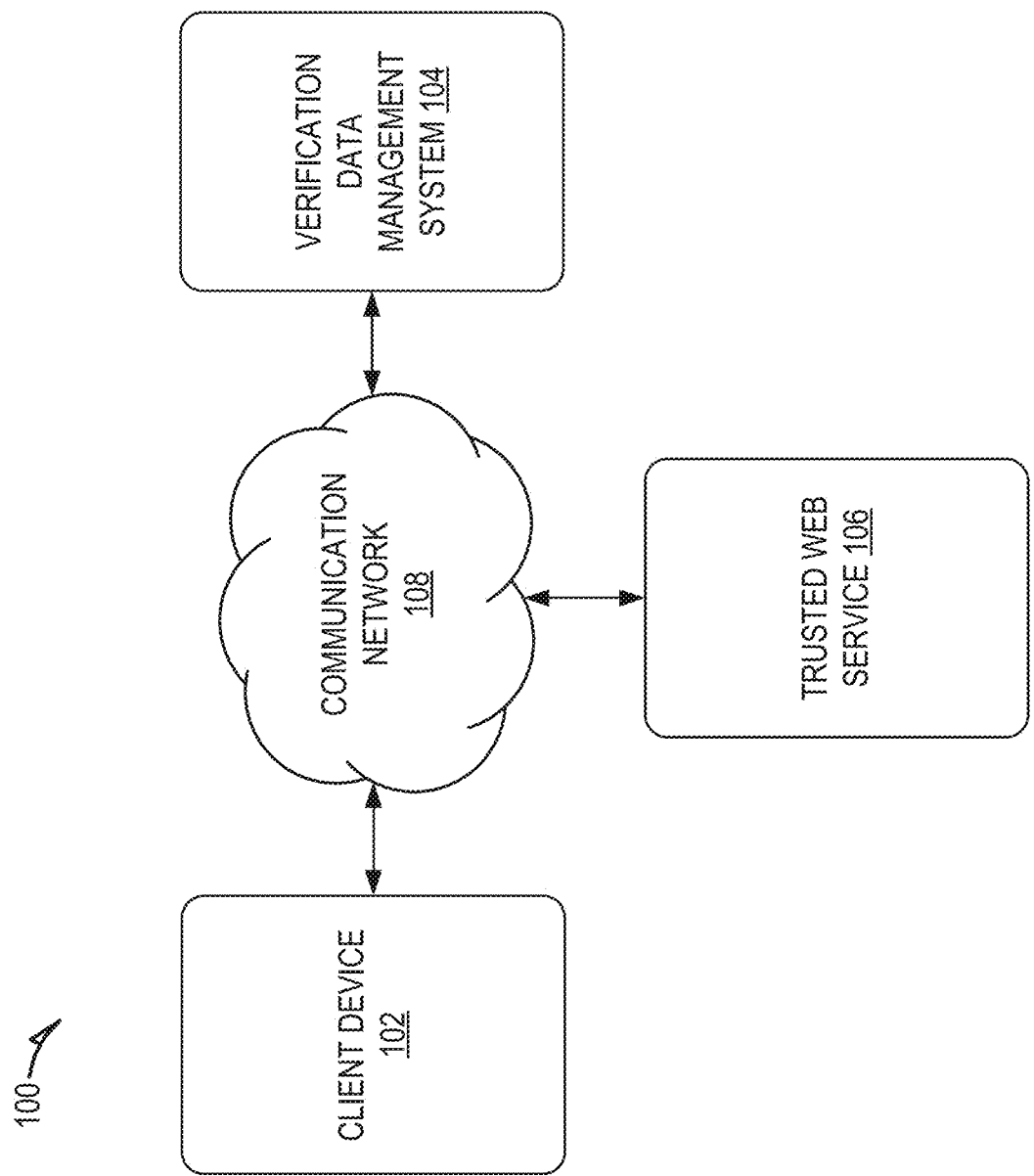
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for generating verified data sets. A verified data management system provides verified data sets for a user. A verified data set is a set of data pertaining to a user that has been verified for authenticity. For example, a verified data set can include personal information about a user, such as the user's age, sex, social security number, address, financial information, credit score, etc. The verified data set can also include reputational data about a user, such as user ratings, reviews, feedback, etc. A user may use a verified data set to provide verification of the user's data to a third party. For example, the user may add the verified data set to the user's account on a web service such as a dating website, retail website, etc., to provide verification that the data provided by the user is truthful.

The verification data management system can obtain verified data in a number of ways, such as gathering personal data from a user and performing a background check to authenticate the data, as well as leveraging the user's existing accounts on trusted web services. A trusted web service is a known service that is assumed to have verified data pertaining to a user. For example, a credit monitoring service such as CREDIT KARMA is trusted to have verified data pertaining to a user's credit score and history. Likewise, banking services such as WELLS FARGO and BANK OF AMERICA are trusted to have verified data such as financial data, the user's address, etc. As another example, an online retail service such as EBAY and AMAZON are trusted to have verified reputational data, such as user feedback, scores, transactional statistics, etc. A user provides the verification data management system with login credentials (i.e., user names and passwords) to access the user's accounts with trusted web services, and the verification data management system uses the provided credentials to access the user's accounts and gather available verified data.

A verified data set may include a selected subset of a user's available verified data. This allows a user to share specified verified data based on the desired application, while maintaining the privacy of other data that the user does not wish to share. For example, a user may wish to share only a verified age and address for an online dating service. The verification data management system allows the user to select the desired subset of available verified data to share (e.g., age and address), thereby allowing the user to maintain the privacy of other data (e.g., social security number).

To generate a verified data set, the verification data management system gathers the available verified data for a user and presents a listing of the available verified data on the user's client device. The user then uses the presented listing to select the verified data that the user would like to include in the verified data set. In response to receiving the user's selections, the verification data management system generates the verified data set based on the selected data. The verification data management system also generates a unique identifier for the generated verified data set. The verification data management system provides the user with the unique identifier, which can be used to access the verified data set. For example, the unique identifier may be included in a link that is selectable to access the verified data set from the verification data management system. As another example, the verification data management system may provide a website where users can enter unique identifiers to access the corresponding verified data sets. Accordingly, the user can provide the unique identifier to another user or post the unique identifier to their account to provide verification of their data.

FIG. 1 shows an example system configuration 100, wherein electronic devices communicate via a network for purposes of exchanging content and other data. As shown, multiple devices (i.e., client device 102, verification data management system 104, and trusted web service 106) are connected to a communication network 108 and configured to communicate with each other through use of the communication network 108. The communication network 108 is any type of network, including a local area network ("LAN"), such as an intranet, a wide area network ("WAN"), such as the Internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the computing device 800 shown in FIG. 8.

To facilitate communication with other computing devices, a computing device includes a communication interface configured to receive a communication, such as a request, data, etc., from another computing device in network communication with the computing device and pass the communication along to an appropriate module running on the computing device. The communication interface also sends a communication to another computing device in network communication with the computing device.

In the system 100 shown in FIG. 1, a user uses client device 102 to interact with the verification data management system 104 to generate verified data sets. For example, a user may use the client device 102 connected to the communication network 108 by direct and/or indirect communication to communicate with and utilize the functionality of the verification data management system 104. Although the shown system 100 includes only one client device 102, this is only for ease of explanation and is not meant to be limiting. One skilled in the art would appreciate that the system 100 can include any number of client devices 102. Further, the verification data management system 104 may concurrently accept connections from and interact with any number of client devices 102.

The verification data management system 104 supports connections from a variety of different types of client devices 102, such as desktop computers; mobile computers; mobile communications devices, e.g., mobile phones, smart phones, tablets; smart televisions; set-top boxes; and/or any other network-enabled computing devices. Hence, the client device 102 may be of varying type, capabilities, operating systems, etc.

A user interacts with the verification data management system 104 via a client-side application installed on the client device 102. In some embodiments, the client-side application includes a verification data management system 104 specific component. For example, the component may be a stand-alone application, one or more application plug-ins, and/or a browser extension. However, the user may also interact with the verification data management system 104 via a third-party application, such as a web browser, that resides on the client device 102 and is configured to communicate with the verification data management system 104. In either case, the client-side application presents a user interface (UI) for the user to interact with the verification data management system 104. For example, the user interacts with the verification data management system 104 via a client-side application integrated with the file system or via a webpage displayed using a web browser application.

The verification data management system 104 is configured to manage verified data and generate verified data sets for multiple user accounts. To facilitate the various services provided by the verification data management system 104, a user creates a user account with the verification data management system 104. The verification data management system 104 stores account information for each created user account, including a unique account identifier identifying the user account, personal information, username, password, email address, home address, credit card information, banking information, etc.

The verification data management system 104 may obtain verified data for a user using multiple methods. In one such method, the verification data management system 104 receives data directly from the user and then performs a background check to verify the provided data. For example, the verification data management system 104 provides the received data to a third-party background checking service. Once the provided data is verified, the verification data management system 104 stores the data in the user's account and marks the data as verified.

In another method, the verification data management system 104 leverages the user's existing account with a trusted web service 106 to access verified data for the user. A trusted web service 106 is a known service that is assumed to have verified data pertaining to a user. For example, a credit monitoring service such as CREDIT KARMA is trusted to have verified data pertaining to a user's credit score and history. Likewise, banking services such as WELLS FARGO and BANK OF AMERICA are trusted to have verified data for the user such as the user's financial data, the user's address, etc. As another example, an online retail service such as EBAY and AMAZON is trusted to have verified reputational data for a user, such as user feedback, scores, transactional statistics, etc.

A user provides the verification data management system 104 with login credentials (i.e., user name and password) to access the user's accounts with the trusted web service 106. The verification data management system 104 uses the provided credentials to communicate with the trusted web service 106 and access the user's accounts. The verification data management system 104 then gathers available verified data for the user form the trusted web service 106. The verification data management system 104 may store the gathered available verified data in a data storage or, alternatively, maintain the available verified data temporarily for purposes of generating a verified data set, which is a subset of the available verified data. After generating the verified data set, which the verification data management system 104 deletes the unneeded or unused verified data from the trusted web service 106. In other words, the original verified data set is maintained in storage until a derived verified data set is generated based on the original verified data set. The original verified data set may then be deleted.

Although only one trusted web service 106 is shown in FIG. 1, this is just for ease of explanation and is not meant to be limiting. The system 100 can include any number of trusted web services 106. Further, the verification data management system 104 may communicate with and gather verified data from multiple trusted web services 106 for each user.

A user uses the client device 102 to communicate with the verification data management system 104 to request that a verified data set be generated for the user. In response to receiving a request from the client device 102, the verification data management system 104 determines the verified data available for the user and presents the user with a listing of the available verified data. For example, the verification data management system 104 transmits the listing of the verified data to the client device 102, and the client device 102 presents the listing to the user. The user uses the client device 102 to select the verified data that the user would like to include in the verified data set. This can include all of the available verified data or a subset of the available verified data.

The client device 102 transmits the user's selections to the verification data management system 104. The verification data management system 104 generates the set of verified data based on the received user selections. For example, the verification data management system 104 may simply include the selected data in the set of verified data, such as listing the user's exact age, birthdate, social security number, etc. As another example, the verification data management system 104 includes a representative data value for the verified data. For example, the verification data management system 104 may include a value range which a verified data value of the user is within or, alternatively, a portion of the verified data value. As an example, the verification data management system 104 may include a value range such as 30-35 in the verified data set in place of the user's exact age of 32. As another example, the verification data management system 104 may include the final four digits of the user's social security number in the verified data set rather than including the user's entire social security number.

In some embodiments, the verification data management system 104 includes an aggregated value in the verified data set. For example, rather than presenting each feedback rating that a user has received, the verification data management system 104 may include an aggregated feedback rating that is calculated based on multiple individual feedback rating values. As another example, the verification data management system 104 may present a total number of transactions completed by the user through one or multiple retail websites.

The verification data management system 104 generates a unique identifier for each verified data set. The unique identifier can be any type of identifier and can be generated using any known method. Once the verified data set is generated, the verification data management system 104 stores the verified data set in a data storage and associates the verified data set with its unique identifier. The unique identifier can be used to access its corresponding verified data set.

The verification data management system 104 provides the unique identifier to the client device 102, which a user can then provide to a third party as verification of presented data. For example, the unique identifier provided to the client device 102 may be embedded in a link that is selectable to cause a client device 102 to communicate with the verification data management system 104 to access the verified data set. As another example, the unique identifier may be provided to the client device 102 embedded in a code, such as a QR code, that can be scanned to access the verified data set. In another embodiments, the unique identifier may be provided to the client device 102 as text string, which can be used to access the verified data set. For example, the verification data management system 104 may provide a website or application that allows a user to enter the unique identifier (e.g., manually enter, copy and paste, etc.) to access the verified data set.

Figure 2:
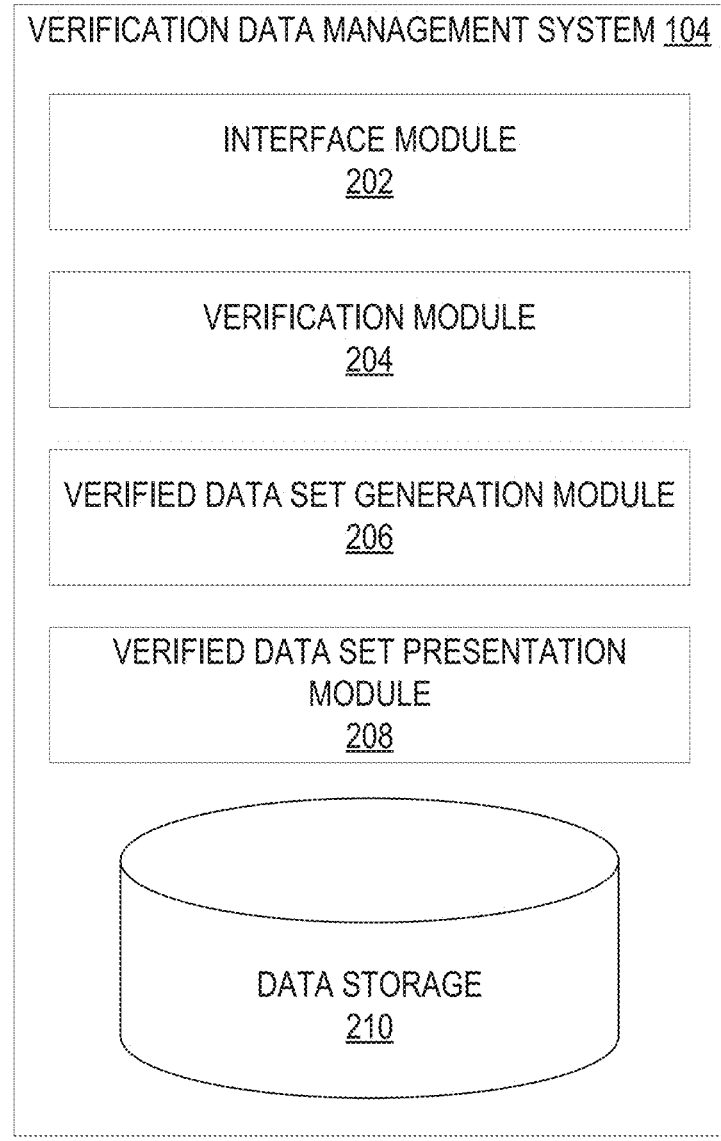
FIG. 2 is a block diagram of the verification data management system, according to some example embodiments.

FIG. 2 is a block diagram of the verification data management system 104, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the verification data management system 104 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the verification data management system 104 includes an interface module 202, a verification module 204, a verified data set generation module 206, a verified data set presentation module 208, and a data storage 210.

The interface module 202 provides a user interface that enables a user to interact with the verification data management system 104. For example, the user interface presents data to the user and provides user interface elements such as text boxes, buttons, scroll bars, etc., that enable the user to use the available functionality of the verification data management system 104. For example, the user interface enables a user to create a new account with the verification data management system 104, including providing relevant information, selecting preferences, etc. Further, the user interface enables users to request that a verified data set be created, view a listing of available verified data, select verified data to include in the verified data set, etc. The user interface further enables users to access and view a generated verified data set. For example, the user interface may enable a user to enter a unique identifier and then present the corresponding verified data set. As another example, the user interface presents the verified data set in response to the verification data management system 104 including a request including the unique identifier. For example, the request is received as a result of a user selecting a link embedded with the unique identifier.

The verification module 204 verifies user data. One way that the verification module 204 verifies user data is by providing data received from the user to a third-party service that verifies the data. For example, the third-party service may provide a background check service based on provided user data, such as the user's social security number, address, etc. The verification module 204 stores verified data received from the third-party service in the data storage 210 and associates the verified data with the corresponding user's account.

In other implementations, the verification module 204 uses the user's existing accounts with trusted web services to verify the user's data. For example, the verification module 204 uses login credentials (i.e., user names and passwords) provided by the user to access the user's account on a trusted web service 106. The verification module 204 then gathers available verified data from the trusted web service 106. For example, the verification module 204 can gather a user's credit score and other credit score related data from the user's account with a credit score monitoring service such as CREDIT KARMA. As another example, the verification module 204 can gather a user's purchase statistics, feedback, and other ratings from the user's account with a retail web service such as EBAY or AMAZON.

In some embodiments, the verification module 204 stores the gathered verified data in the data storage 210 and associates the verified data with the user's account. Alternatively, the verification module 204 gathers the verified data for the purposes of generating a verified data set, after which the verified data is deleted by the verification data management system 104.

Below is sample programming code for implementing the verification module 204:

```
procedure Boolean confirmIdentity(fullName, address, idDocType,
idDocNum)
begin
    var api = IdentityVerificationApi( )
    return api.confirmRequestorsIdentity(fullName, address, idDocType,
        idDocNum)
end
procedure Boolean confirmThirdPartyAccountOwnership(systemName,
userName, userPassword)
begin
    if (isSupported(systemName))
    begin
        var verifier = new AccountOwnershipVerifier(systemName)
        return verifier.confirmValidLogin(userName, userPassword)
    end
    return false
end
procedure array importUsersDataAttributes(systemName, userName,
userPassword, attributeTypes[ ])
begin
    var dataImporter = new TrustedSystemDataImporter(systemName)
    dataImporter.loginUser(userName, userPassword)
    var dataAttributeValues = dataImporter.importData(attributeTypes)
    return dataAttributeValues
end
```

The verified data set generation module 206 generates verified data sets for a user. In response to receiving a request from a client device 102 to generate a verified data set, the verified data set generation module 206 gathers available verified data for the user. This can include gathering stored verified data from the data storage 210, as well as causing the verification module 204 to gather verified data for the user by, for example, accessing the user's accounts with trusted web services 106.

The verified data set generation module 206 provides the user with a listing of the available verified data for the user. The user can use the listing of the available verified data to select verified data that the user would like to include in the verified data set. In response to receiving the user's selections, the verified data set generation module 206 generates the verified data set based on the user's selection. Generating the verified data set may include transforming and/or anonymizing the data, as is discussed in greater detail in the discussion of FIG. 3 below. The verified data set may be simply a set of stored data or, alternatively an image that presents the selected verified data. In any case, the user is not allowed to modify the verified data set after it has been generated.

The verified data set generation module 206 also generates a unique identifier for the verified data set. The verified data set generation module 206 stores the generated verified data set in the data storage 210 and associates the verified data set with its unique identifier. The verified data set generation module 206 provides the unique identifier to the user's client device 102. The unique identifier enables a user to access its corresponding verified data set. For example, the unique identifier provided to the client device 102 may be embedded in a link or code that when selected and/or scanned causes the user's client device 102 to transmit a request including the unique identifier to the verified data management system 104. In response to receiving the request, the verified data set presentation module 208 uses the included unique identifier to access the corresponding verified data set in the data storage 210 and causes the verified data set to be presented on the requesting client device 102.

In another embodiment, a user uses their client device 102 to communicate with the verification data management system 104 to access a user interface for accessing a verified data set. The user uses the user interface to enter the unique identifier. In response to receiving the unique identifier, the verified data set presentation module 208 uses the unique identifier to access the corresponding verified data set in the data storage 210 and causes the verified data set to be presented on the requesting client device 102.

In some embodiments, the unique identifier is provided to the client device 102 in an image of the verified data set. Accordingly, the user can provide the image of the verified data set to a third party (e.g., directly to the third party or posting to a user profile on a web service) to provide the verified data. A user can use the included unique identifier to verify with the verification data management system 104 that the data presented in the image of the verified data set is in fact authentic.

Below is sample programming code for implementing a verified data set generation module 206:

```
procedure string createPassport(trustedSystems[ ], attributeTypes[ ],
transformationRules[ ])
begin
    var[ ] attributeValues = [ ]
    var passportID = generateUniquePassportID( )
    foreach (trustedSystem in trustedSystems)
    begin
        if (trustedSystem.needIdentityVerification)
            confirmIdentity(trustedSystem.fullName,
trustedSystem.address, trustedSystem.idDocType,
trustedSystem.idDocNum)
        else
            confirmThirdPartyAccountOwnership(trustedSystem.name,
trustedSystem.userName, trustedSystem.userPassword)
```

-continued

```
        attributeValues +=
            importUsersDataAttributes(trustedSystem.name,
    trustedSystem.userName, trustedSystem.userPassword, attributeTypes)
        end
        attributeValues = transformDataAttributes(attributeTypes,
        attributeValues)
        attributeValues = anonymizeDataAttributes(attributeTypes,
        attributeValues)
        createPassportImage(passportID, attributeValues)
        generateAndAttachTransientMailbox(passportID)
        var passportUrl = generatePassportLink(passportID)
        return passportUrl
end
```

Figure 3:
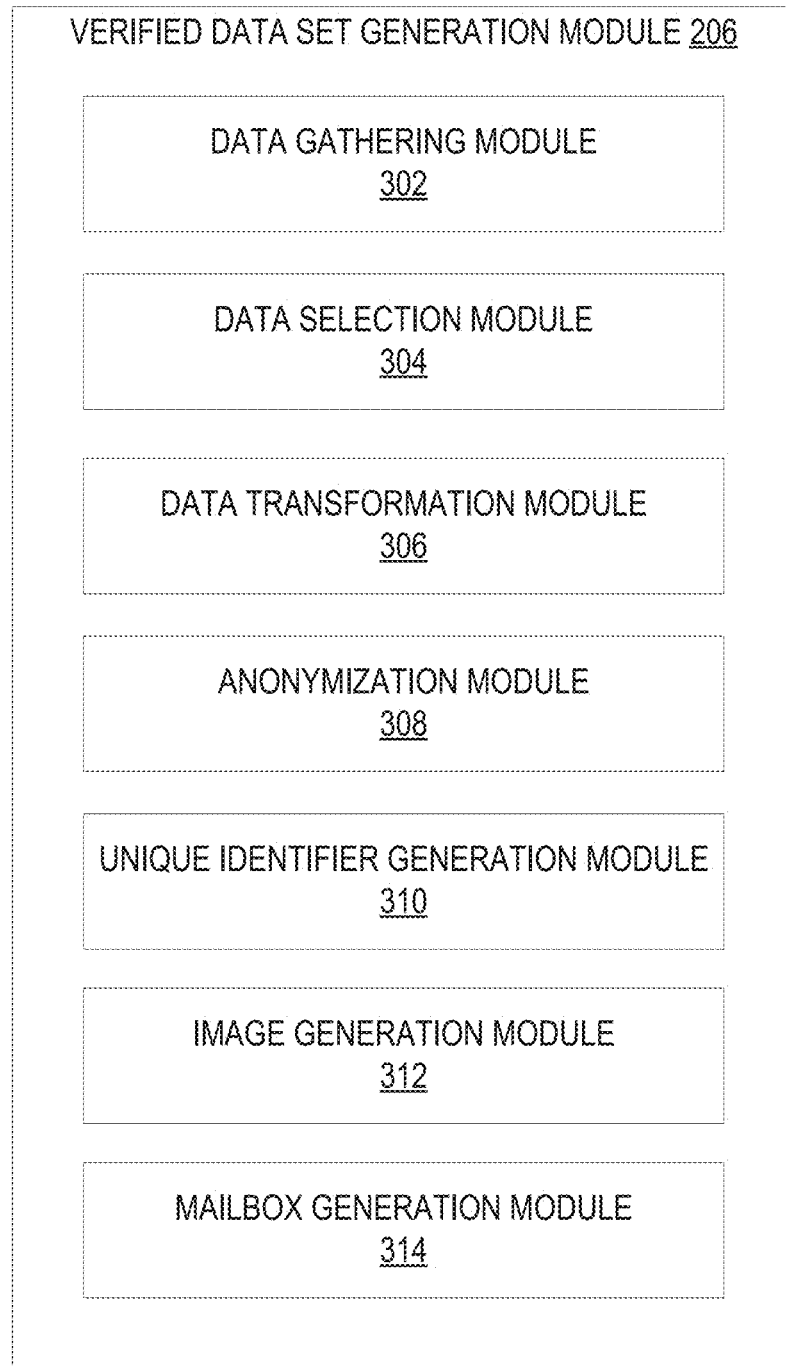
FIG. 3 is a block diagram of the verified data set generation module, according to some example embodiments.

FIG. 3 is a block diagram of the verified data set generation module 206, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the verified data set generation module 206 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the verified data set generation module 206 includes a data gathering module 302, a data selection module 304, a data transformation module 306, an anonymization module 308, a unique identifier generation module 310, an image generation module 312, and a mailbox generation module 314.

The data gathering module 302 gathers available verified data for a user. For example, the data gathering module 302 gathers the available verified data for a user in response to receiving a request from a client device 102 to generate a verified data set for the user. The data gathering module 302 can gather verified data stored in the data storage 210 as well as cause the verification module 204 to gather verified data from one or more trusted web services 106. The gathered verified data can include data gathered from both the data storage 210 as well as from one or more of the trusted web services 106.

The data selection module 304 identifies the verified data that the user wants to include in the verified data set. For example, the data selection module 304 uses the gathered verified data to generate a listing of available verified data, which is presented to the user. The user uses the listing of available verified data to select verified data that the user would like to include in the verified data set.

As another example, the data selection module 304 presents the user with a selection of verified data set templates. Each template may include a unique combination of verified data based on commonly selected verified data sets or commonly used verified data sets for specified purposes. For example, a template may be directed to dating websites and include verified data that is commonly shared for this purpose, such as age and salary information. As another example, a template may be directed to retail websites and include verified data that is commonly shared for this purpose, such as the user's purchase feedback history, ratings, etc. As another example, a template may include the most commonly selected set of verified data. A user can select one of the templates to choose the corresponding verified data to be included in the verified data set.

The data transformation module 306 transforms selected verified data. While verified data can be included in a verified data set in an unaltered form, in some instances a user may desire to have the data transformed prior to being included in the verified data set. Transforming verified data includes presenting a representation of the data without presenting the actual data value itself. For example, a data value for age, such as 27, can be represented as an age range of 25-30 years old. Similarly, a value for salary, such as $127,000, can be represented as being over $100,000.

The data transformation module 306 may transform data in several ways. As explained in the above examples, the data transformation module 306 can transform a verified data value based on a value range, such as 25-30, to represent the value 27. The data transformation module 306 can also transform data by representing the data value with a meaning of the data value. For example, rather than present a data value for a user's zip code and/or address, the data transformation module 306 can present the city that the user lives in, such as San Francisco or New York. As another example, the data transformation module 306 can present a user's credit score with a word representing the relative meaning of the score. For example, rather than presenting the credit score value of 780, the data transformation module 306 can present the word Excellent to indicate that the user has excellent credit. As another example, rather than presenting the credit score value of 675, the data transformation module 306 can present the word Fair to indicate that the user has fair credit.

The data transformation module 306 transforms data values based on a set of transformation rules that dictate which types of data values, if included in a verified data set, should be transformed, and how the data values should be transformed. For example, the transformation rules can dictate that the user's address should be represented by the city name and that the user's age should be represented by an age range. The transformation rules may be standard rules used for all verified data sets, or a user may select the transformation rules for transforming the data when requesting that the verified data set be generated.

In some embodiments, the data transformation module 306 uses a table of transformation values to transform data. The table of transformation values lists potential input data values and their corresponding output, transformed data values. For example, the table of transformation values may list zip codes and their corresponding city names. As another example, the list of potential data values may include age values, and the corresponding age range to be presented. The data transformation module 306 searches the table of transformation values based on a verified data value to identify the corresponding output transformed data value to be included in the verified data set.

Below is sample programming code for implementing the data transformation module 306:

```
procedure array transformDataAttributes(attributeTypes[ ],
attributeValues[ ])
begin
    foreach (attributeType in attributeTypes)
    begin
        if (attributeType.type == ATTRIBUTE_TYPE_AGE)
        begin
            // allow converting to age band instead, e.g. 37 => 36-40
        end
        elseif (attributeType.type ==
```

```
        ATTRIBUTE_TYPE_ZIP_CODE)
        begin
            // allow converting to state or country, e.g. 10010 => New
               York or USA
        end
        elseif (attributeType.type ==
        ATTRIBUTE_TYPE_CREDIT_SCORE)
        begin
            // allow converting to credit rating, e.g. 780 => Excellent
        end
    end
    return attributeValues
end
```

The anonymization module 308 anonymizes verified data prior to its inclusion in a verified data set. Anonymizing verified data is performed to protect the user's confidential data by either removing and/or obscuring a portion of the user's data or transforming the data. For example, the anonymization module 308 may anonymize the user's social security number by removing or obscuring the first 5 digits of the social security number and only presenting the last 4 digits of the social security number. As another example, the anonymization module 308 may remove a user's last and middle names, leaving only the user's first name. As another example, the anonymization module 308 may remove the user's street address, leaving only the city and state. As another example, the anonymization module 308 may convert the user's birthdate (e.g., 6/28/1980) to the user's age (e.g., 37).

The anonymization module 308 anonymizes the user's data based on a set of anonymization rules that dictate which data should be anonymized and how the data should be anonymized. For example, the anonymization rules may dictate that the user's social security number have the first 5 digits removed or obscured. As another example, the anonymization rules may dictate that the user's street address be removed or obscured.

Below is sample programming code for implementing an anonymization module 308:

```
procedure void anonymizeDataAttributes(attributeTypes[ ],
attributeValues[ ])
begin
    foreach (attributeType in attributeTypes)
    begin
        if (attributeType.type ==
        ATTRIBUTE_TYPE_LEGAL_NAME)
        begin
            // remove middle and last name, leaving only first, e.g.
Marianne Leigh Connors => Marianne
        end
        elseif (attributeType.type ==
        ATTRIBUTE_TYPE_DATE_OF_BIRTH)
        begin
            // convert to age, e.g., 6/28/1980 => 37 years old
        end
        elseif (attributeType.type ==
        ATTRIBUTE_TYPE_FULL_ADDRESS)
        begin
            // leave only city and state, e.g., 1 Hickory Lane,
Smallville, Kansas 66605 => Smallville, KS
        end
    end
    return attributeValues
end
```

The unique identifier generation module 310 generates a unique identifier for a verified data set. The unique identifier generation module 310 may use any of a variety of known methods for generating a unique identifier that is unique for each verified data set. In other words, no two verified data sets will be assigned the same unique identifier. For example, the unique identifier generation module 310 may simply assign incrementing values for each verified data set. The unique identifier is used to identify its corresponding verified data set. For example, once a verified data set is generated, the verified data set is stored in the data storage 210 and associated with the unique identifier.

In some embodiments, the unique identifier generation module 310 further generates a link and/or code that is embedded with the unique identifier. The link and/or code may cause a user's client device 102 to communicate with the verification data management system 104 to provide the verification data management system 104 with the unique code and request its corresponding verified data set. The code may be any type of known code, such as a bar code, Quick Response (QR) code, etc. The link may be web link, such as a web hyperlink.

The image generation module 312 generates an image of the verified data set. The generated image may include the verified data set as well as the unique identifier and/or link or code embedded with the unique identifier. The generated image can be provided by a user to a third party to verify the user's information. For example, the user can post the generated image to their account on a dating site, include the generated image in a listing for an item on sale by the user, etc. The unique identifier and/or link or code included in the generated image allows a user to verify that the data included in the generated image is accurate. For example, a user who would like to verify that the image is accurate and has not been tampered with or altered can use the unique identifier (e.g., select the presented link) to communicate with the verification data management system 104 to access the verified data set maintained by the verification data management system 104.

The mailbox generation module 314 generates an electronic mailbox for a verified data set. The electronic mailbox allows a user to receive and send messages without having to provide their personal contact information. For example, the mailbox generation module 314 enables to the user to send and receive a variety of types of messages, such as email, SMS, voice, etc. The messaging can be performed through a platform provided by the verification data management system 104. For example, the verification data management system 104 can present a user with a messaging interface when a verified data set is presented. A user can use the interface to transmit messages to the user associated with the verified data set. As another example, contact info (email address, phone number, etc.) for transmitting messages to the electronic mailbox can be included in the image of the verified data set. A user can use the provided contact information to communicate with the user associated with the verified data set.

Figure 4:
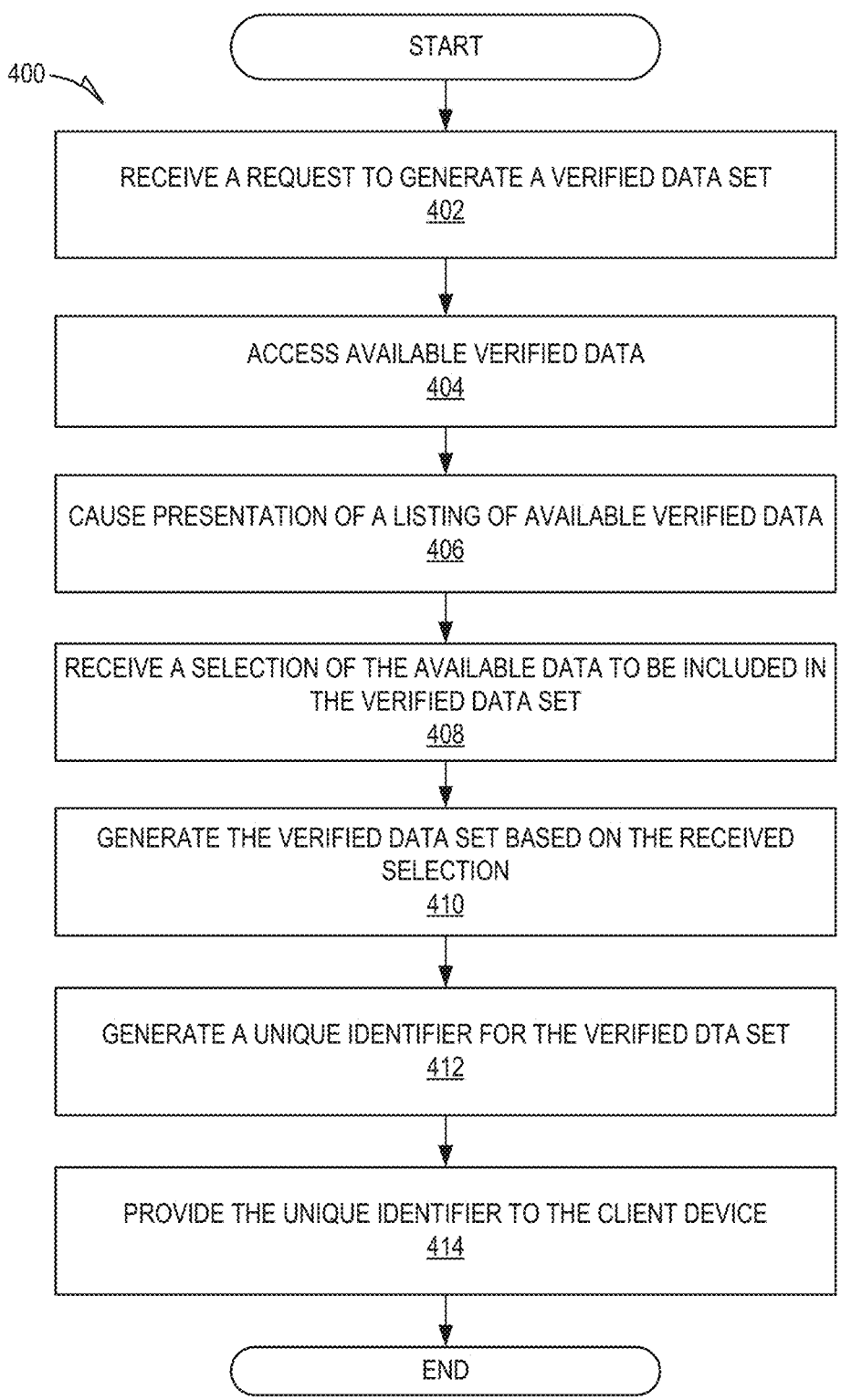
FIG. 4 is a flowchart showing an example method of generating a verified data set, according to certain example embodiments.

FIG. 4 is a flowchart showing an example method 400 of generating a verified data set according to certain example embodiments. The method 400 may be embodied in computer-readable instructions for execution by one or more processors such that the operations of the method 400 may be performed in part or in whole by the verification data management system 104; accordingly, the method 400 is described below by way of example with reference thereto. However, it shall be appreciated that at least some of the operations of the method 400 may be deployed on various other hardware configurations and the method 400 is not intended to be limited to the verification data management system 104.

At operation 402, the interface module 202 receives a request to generate a verified data set. The request is received from a client device 102 of a user. The verified data set includes verified data of the user.

At operation 404, the data gathering module 302 accesses available verified data. The data gathering module 302 gathers verified data stored in the data storage 210 and/or causes the verification module 204 to gather verified data from one or more trusted web services 106. The gathered verified data can include data gathered from both the data storage 210 as well as from one or more of the trusted web services 106.

At operation 406, the data selection module 304 causes presentation of a listing of available verified data. The user uses the listing of available verified data to select verified data that the user would like to include in the verified data set.

In some embodiments, the data selection module 304 presents the user with a selection of verified data set templates. Each template may include a unique combination of available verified data based on commonly selected verified data sets or commonly used verified data sets for specified purposes. For example, a template may be directed to dating websites and include verified data that is commonly shared for this purpose, such as age and salary information. As another example, a template may be directed to retail websites and include verified data that is commonly shared for this purpose, such as the user's purchase feedback history, ratings, etc. As another example, a template may include the most commonly selected set of verified data. A user can select one of the templates to choose the corresponding verified data to be included in the verified data set.

At operation 408, the data selection module 304 receives a selection of the available data to be included in the verified data set. For example, the user may have selected the verified data from the listing of available verified data or the user may have selected one of the available verified data templates.

At operation 410, the verified data set generation module 206 generates the verified data set based on the received selection. This may include transforming and/or anonymizing the verified data set, as will be discussed in greater detail in relation to FIG. 5.

At operation 412, the unique identifier generation module 310 generates a unique identifier for the verified data set. The unique identifier generation module 310 may use any of a variety of known methods for generating a unique identifier that is unique for each verified data set. In other words, no two verified data sets will be assigned the same unique identifier. For example, the unique identifier generation module 310 may simply assign incrementing values for each verified data set. The unique identifier is used to identify its corresponding verified data set. For example, once a verified data set is generated, the verified data set is stored in the data storage 210 and associated with the unique identifier.

In some embodiments, the unique identifier generation module 310 further generates a link and/or code that is embedded with the unique identifier. The link and/or code may cause a user's client device 102 to communicate with the verified data management system 104 to provide the verified data management system with the unique code and request its corresponding verified data set. The code may be any type of known code, such as a bar code, Quick Response (QR) code, etc. The link may be web link, such as a web hyperlink.

At operation 414, the verification data management system 104 provides the unique identifier to the client device 102. As explained above, the unique identifier enables a user to access the verified data set. A user can therefore provide the unique identifier to a third party to verify the truthfulness of the user's data.

Figure 5:
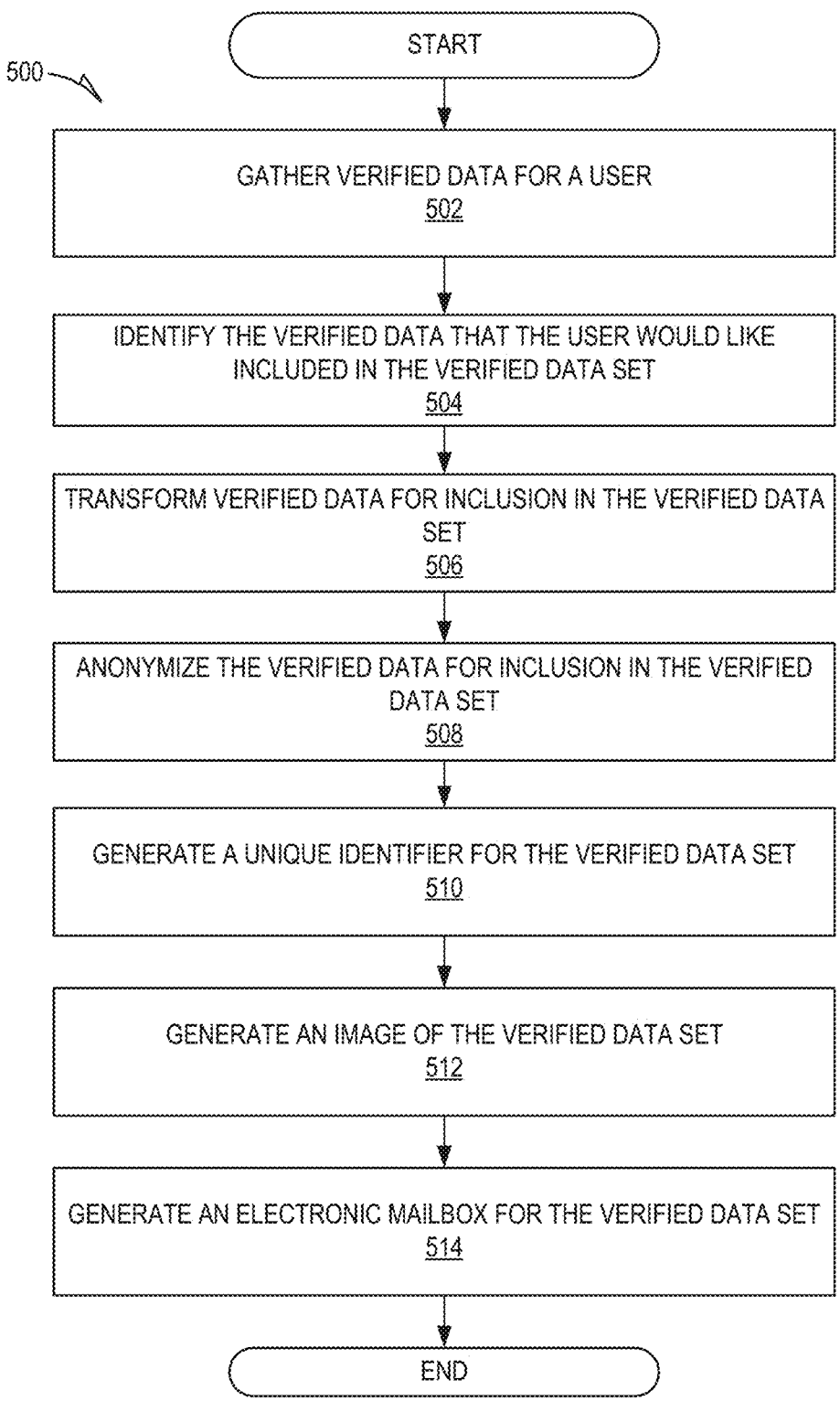
FIG. 5 is a flowchart showing an example method of generating a verified data set, according to certain example embodiments.

FIG. 5 is a flowchart showing an example method 500 of generating a verified data set, according to certain example embodiments. The method 500 may be embodied in computer-readable instructions for execution by one or more processors such that the operations of the method 500 may be performed in part or in whole by the verified data set generation module 206; accordingly, the method 500 is described below by way of example with reference thereto. However, it shall be appreciated that at least some of the operations of the method 500 may be deployed on various other hardware configurations and the method 500 is not intended to be limited to the verified data set generation module 206.

At operation 502, the data gathering module 302 gathers verified data for a user. For example, the data gathering module 302 gathers the available verified data for a user in response to receiving a request from a client device 102 to generate a verified data set for the user. The data gathering module 302 can gather verified data stored in the data storage 210 as well as cause the verification module 204 to gather verified data from one or more trusted web services 106. The gathered verified data can include data gathered from both the data storage 210 as well as from one or more of the trusted web services 106.

At operation 504, the data selection module 304 identifies the verified data that the user would like included in the verified data set. For example, the data selection module 304 uses the gathered verified data to generate a listing of available verified data, which is presented to the user. The user uses the listing of available verified data to select verified data that the user would like to include in the verified data set.

As another example, the data selection module 304 presents the user with a selection of verified data set templates. Each template may include a unique combination of verified data based on commonly selected verified data sets or commonly used verified data sets for specified purposes. For example, a template may be directed to dating websites and include verified data that is commonly shared for this purpose, such as age and salary information. As another example, a template may be directed to retail websites and include verified data that is commonly shared for this purpose, such as the user's purchase feedback history, ratings, etc. As another example, a template may include the most commonly selected set of verified data. A user can select one of the templates to choose the corresponding verified data to be included in the verified data set.

At operation 506, the data transformation module 306 transforms verified data for inclusion in the verified data set. While verified data can be included in a verified data set in an unaltered form, in some instances a user may desire to have the data transformed prior to being included in the verified data set. Transforming verified data includes presenting a representation of the data without presenting the actual data value itself. For example, a data value for age, such as 27, can be represented as an age range of 25-30 years old. Similarly, a value for salary, such as $127,000, can be represented as being over $100,000.

The data transformation module 306 may transform data in several ways. As explained in the above examples, the data transformation module 306 can transform a verified data value based on a value range, such as 25-30, to represent the value 27. The data transformation module 306 can also transform data by representing the data value with a meaning of the data value. For example, rather than present a data value for a user's zip code and/or address, the data transformation module 306 can present the city that the user lives in, such as San Francisco or New York. As another example, the data transformation module 306 can present a user's credit score with a word representing the relative meaning of the score. For example, rather than presenting the credit score value of 780, the data transformation module 306 can present the word Excellent to indicate that the user has excellent credit. As another example, rather than presenting the credit score value of 675, the data transformation module 306 can present the word Fair to indicate that the user has fair credit.

The data transformation module 306 transforms data values based on a set of transformation rules that dictate which types of data values, if included in a verified data set, should be transformed, and how the data values should be transformed. For example, the transformation rules can dictate that the user's address should be represented by the city name and that the user's age should be represented by an age range. The transformation rules may be standard rules used for all verified data sets, or a user may select the transformation rules for transforming the data when requesting that the verified data set be generated.

In some embodiments, the data transformation module 306 uses a table of transformation values to transform data. The table of transformation values lists potential input data values and their corresponding output, transformed data values. For example, the table of transformation values may list zip codes and their corresponding city names. As another example, the list of potential data values may include age values and the corresponding age range to be presented. The data transformation module 306 searches the table of transformation values based on a verified data value to identify the corresponding output transformed data value to be included in the verified data set.

At operation 508, the anonymization module 308 anonymizes the verified data for inclusion in the verified data set. Anonymizing verified data is performed to protect the user's confidential data by either removing and/or obscuring a portion of the user's data or transforming the data. For example, the anonymization module 308 may anonymize the user's social security number by removing or obscuring the first 5 digits of the social security number and only presenting the last 4 digits of the social security number. As another example, the anonymization module 308 may remove a user's last and middle names, leaving only the user's first name. As another example, the anonymization module 308 may remove the user's street address, leaving only the city and state. As another example, the anonymization module 308 may convert the user's birthdate (e.g., 6/28/1980) to the user's age (e.g., 37).

The anonymization module 308 anonymizes the user's data based on a set of anonymization rules that dictate which data should be anonymized and how the data should be anonymized. For example, the anonymization rules may dictate that the user's social security number have the first 5 digits removed or obscured. As another example, the anonymization rules may dictate that the user's street address be removed or obscured.

At operation 510, the unique identifier generation module 310 generates a unique identifier for the verified data set. The unique identifier generation module 310 may use any of a variety of known methods for generating a unique identifier that is unique for each verified data set. In other words, no two verified data sets will be assigned the same unique identifier. For example, the unique identifier generation module 310 may simply assign incrementing values for each verified data set. The unique identifier is used to identify its corresponding verified data set. For example, once a verified data set is generated, the verified data set is stored in the data storage 210 and associated with the unique identifier.

In some embodiments, the unique identifier generation module 310 further generates a link and/or code that is embedded with the unique identifier. The link and/or code may cause a user's client device 102 to communicate with the verified data management system 104 to provide the verified data management system with the unique code and request its corresponding verified data set. The code may be any type of known code, such as a bar code, Quick Response (QR) code, etc. The link may be web link, such as a web hyperlink.

At operation 512, the image generation module 312 generates an image of the verified data set. The generated image may include the verified data set as well as the unique identifier and/or link or code embedded with the unique identifier. The generated image can be provided by a user to a third party to verify the user's information. For example, the user can post the generated image to their account on a dating site, include the generated image in a listing for an item on sale by the user, etc. The unique identifier and/or link or code included in the generated image allows a user to verify that the data included in the generated image is accurate. For example, a user who would like to verify that the image is accurate and has not been tampered with or altered can use the unique identifier (e.g., select the presented link) to communicate with the verification data management system 104 to access the verified data set maintained by the verification data management system 104.

At operation 514, the mailbox generation module 314 generates an electronic mailbox for the verified data set. The electronic mailbox allows a user to receive and send messages without having to provide their personal contact information. For example, the mailbox generation module 314 enables to the user to send and receive a variety of types of messages, such as email, SMS, voice, etc. The messaging can be performed through a platform provided by the verification data management system 104. For example, the verification data management system 104 can present a user with a messaging interface when a verified data set is presented. A user can use the interface to transmit messages to the user associated with the verified data set. As another example, contact info (email address, phone number, etc.) for transmitting messages to the electronic mailbox can be included in the image of the verified data set. A user can use the provided contact information to communicate with the user associated with the verified data set.

Figure 6:
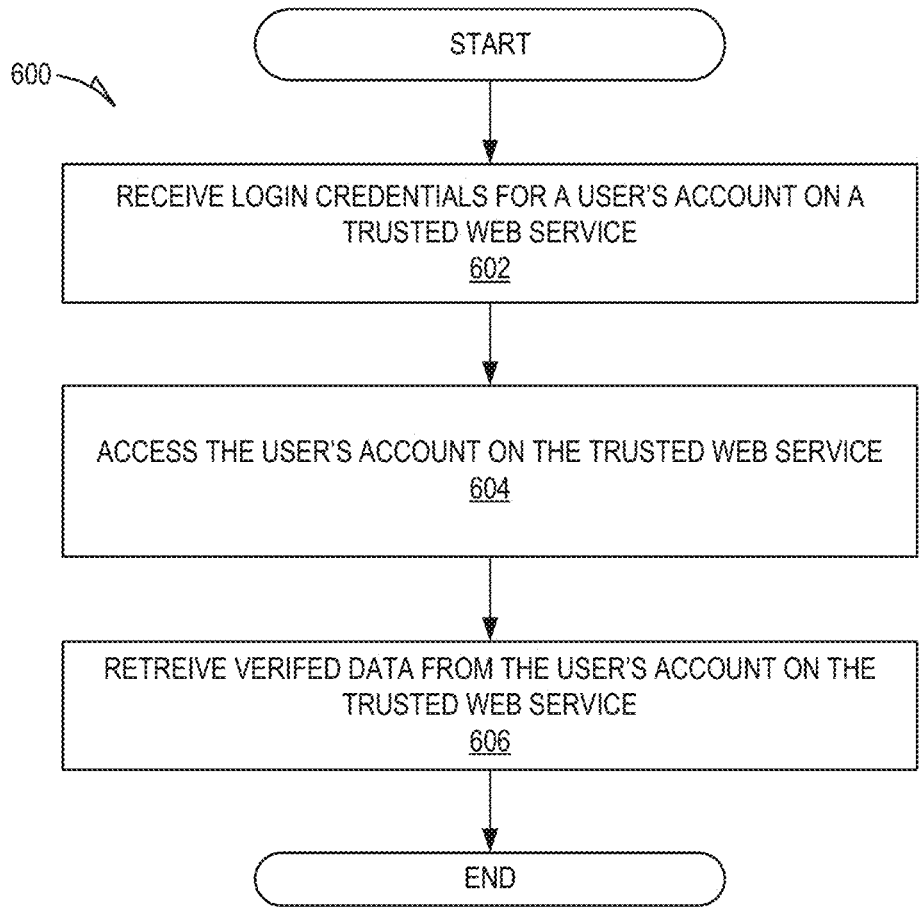
FIG. 6 is a flowchart showing an example method of generating a verified data set, according to certain example embodiments

FIG. 6 is a flowchart showing an example method 600 of generating a verified data set, according to certain example embodiments. The method 600 may be embodied in computer-readable instructions for execution by one or more processors such that the operations of the method 600 may be performed in part or in whole by the verification module 204; accordingly, the method 600 is described below by way of example with reference thereto. However, it shall be appreciated that at least some of the operations of the method 600 may be deployed on various other hardware configurations and the method 600 is not intended to be limited to the verification module 204.

At operation 602, the verification module 204 receives login credentials (i.e., user name and password) for a user's account on a trusted web service 106. A trusted web service 106 is a known service that is assumed to have verified data pertaining to a user. For example, a credit monitoring service such as CREDIT KARMA is trusted to have verified data pertaining to a user's credit score and history. Likewise, banking services such as WELLS FARGO and BANK OF AMERICA are trusted to have verified data such as financial data, the user's address, etc. As another example, an online retail service such as EBAY and AMAZON are trusted to have verified reputational data, such as user feedback, scores, transactional statistics, etc.

At operation 604, the verification module 204 accesses the user's account on the trusted web service 106. For example, the verification module 204 uses the user's provided login credentials (i.e., user name and password) to communicate with the trusted web service 106 and access the user's account.

At operation 606, the verification module 204 retrieves verified data from the user's account on the trusted web service 106. For example, the verification module 204 uses provided Application Programming Interface (API) calls to access the user's verified data. As another example, the verification module 204 scrapes the verified content from web content retrieved from the trusted web service 106. Scraping the verified content includes scanning the content based on a set of rules to identify and extract the desired verified data.

Figure 7A:
FIGS. 7A-D show a user interface for creating a verified data set, according to some example embodiments.

FIGS. 7A-7D show a user interface 700 for creating a verified data set, according to some example embodiments. As shown in FIG. 7A, the user interface 700 presents the user with a listing 702 of the verified data that the user can include in the verified data set. The user can select, from the listing 702, the specific data that the user would like included in the verified data set. Further, the user interface 700 includes a preview 704 of the resulting verified data set based on the user's selection. The user has not yet selected any verified data.

Figure 7B:
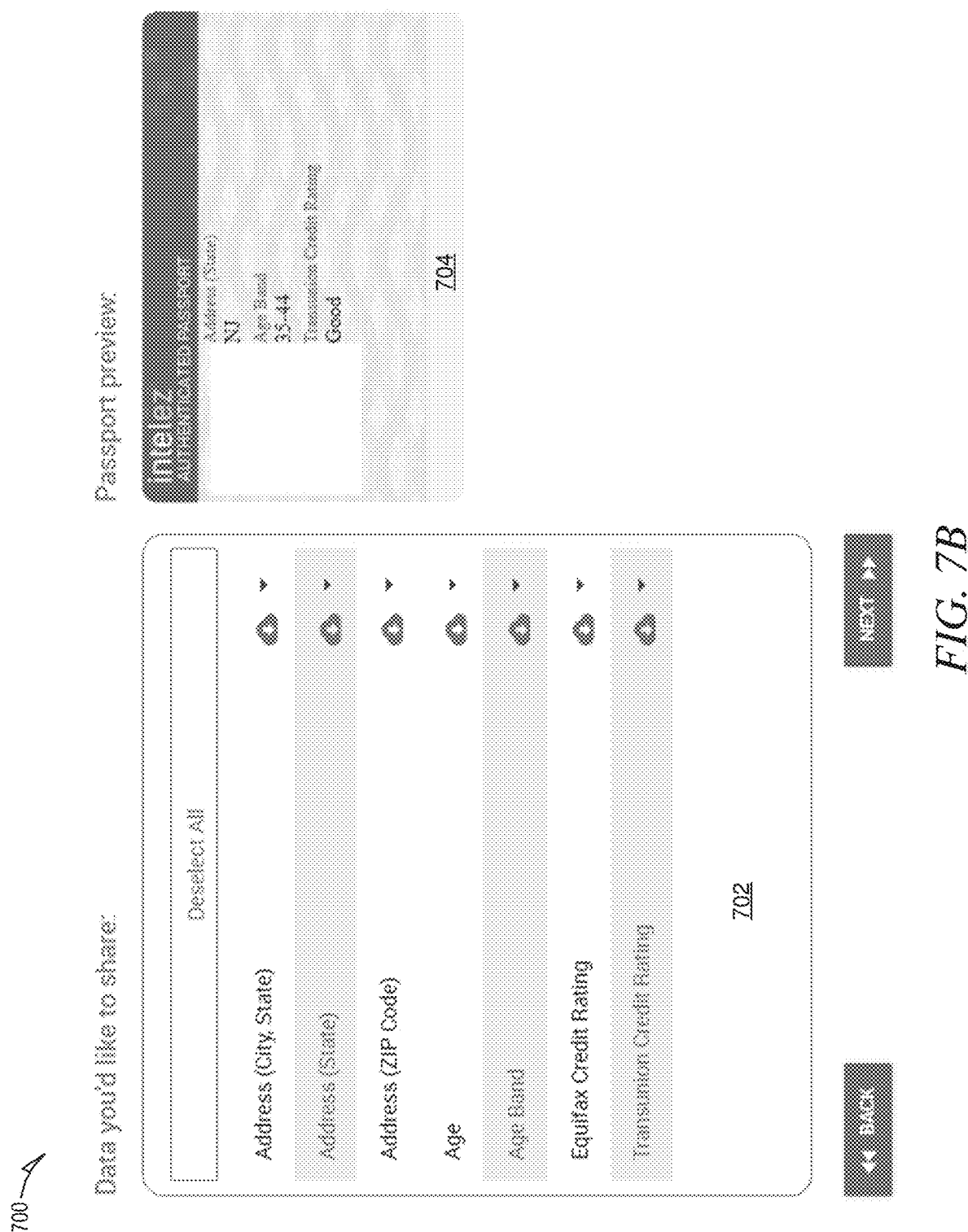

In FIG. 7B, the user has selected verified data to include in the verified data set. Specifically, the user has selected their address, age, and credit rating. This data is included in the preview 704 of the verified data set. Further, the user's address has been anonymized to include only the user's state of residence (i.e., NJ). Further, the user's age and credit score have both been transformed prior to inclusion in the verified data set. For example, the user's age is represented as a range of between 35-44 years old. Further, the user's credit score is represented by the work "good" rather than the user's exact credit score value.

Figure 7C:
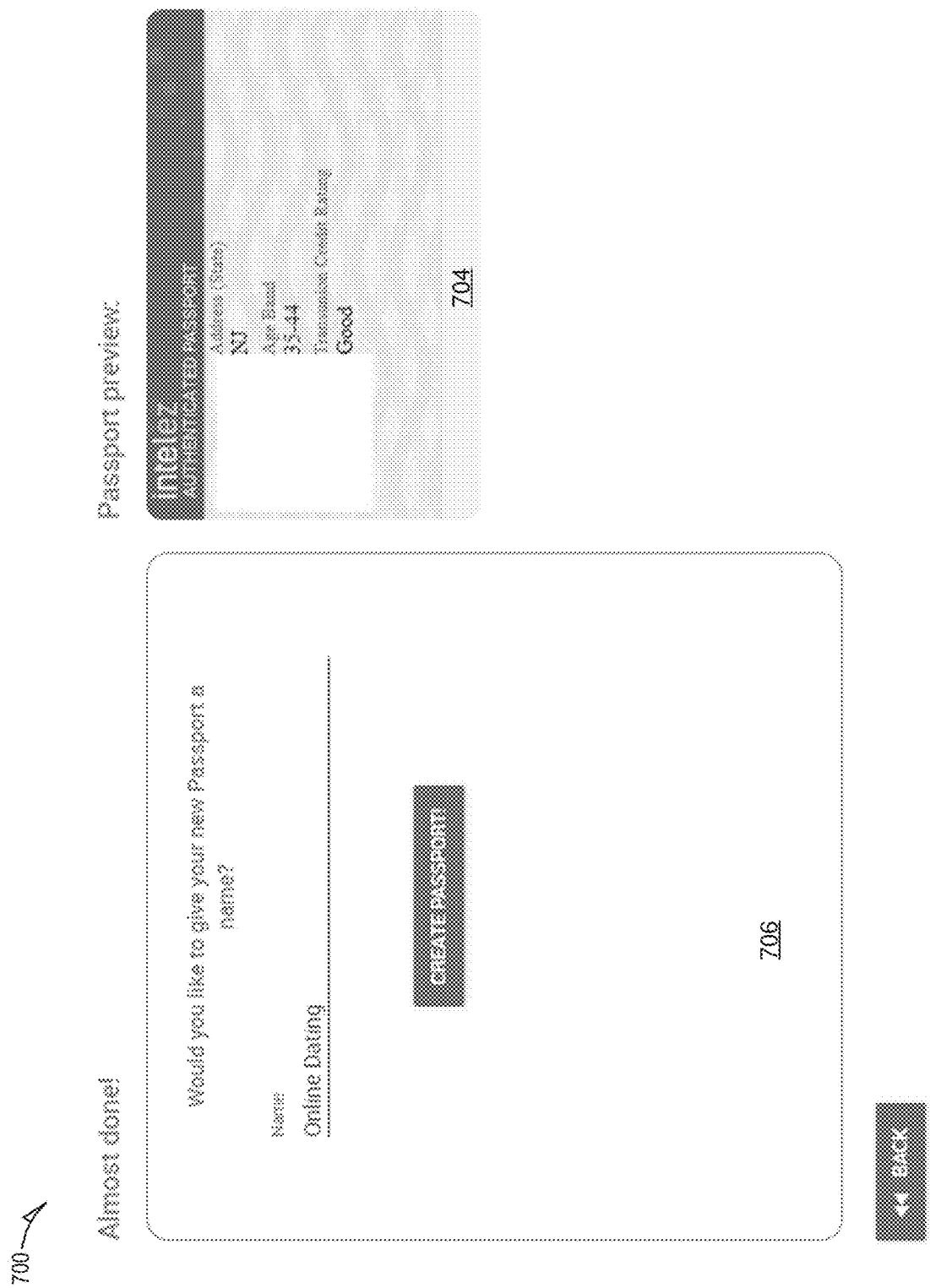

In FIG. 7C, the user has selected to finalize the verified data set. The user is presented with a naming interface 706 in which the user can assign a name to the verified data set. As shown, the user has selected to assign the name "Online Dating" to the verified data set.

Figure 7D:
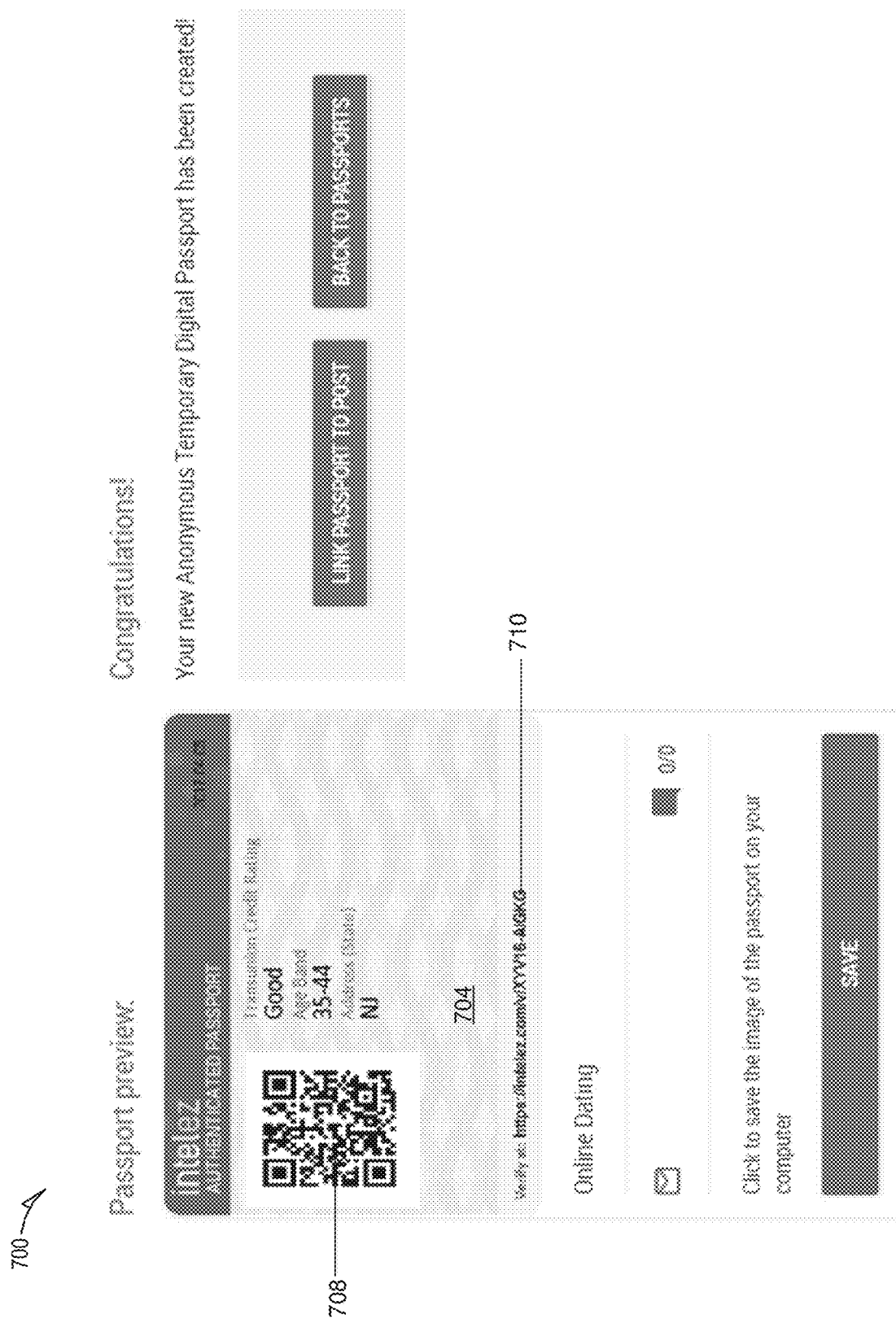

In FIG. 7D, the preview 704 has been moved within the user interface 700. Further, the preview includes a code 708 and a link 710 that are embedded with the unique identifier assigned to the verified data set. Both the code 708 and the link 710 provide a user with access to the verified data set. For example, a user can scan the code 708 with a client device 102, which will cause the client device 102 to transmit the embedded unique identifier to the verification data management system 104 and request the corresponding verified data set. Likewise, a user can select the link 710 with an input of their client device 102, which will cause the client device 102 to transmit the embedded unique identifier to the verification data management system 104 and request the corresponding verified data set.

Figure 8:
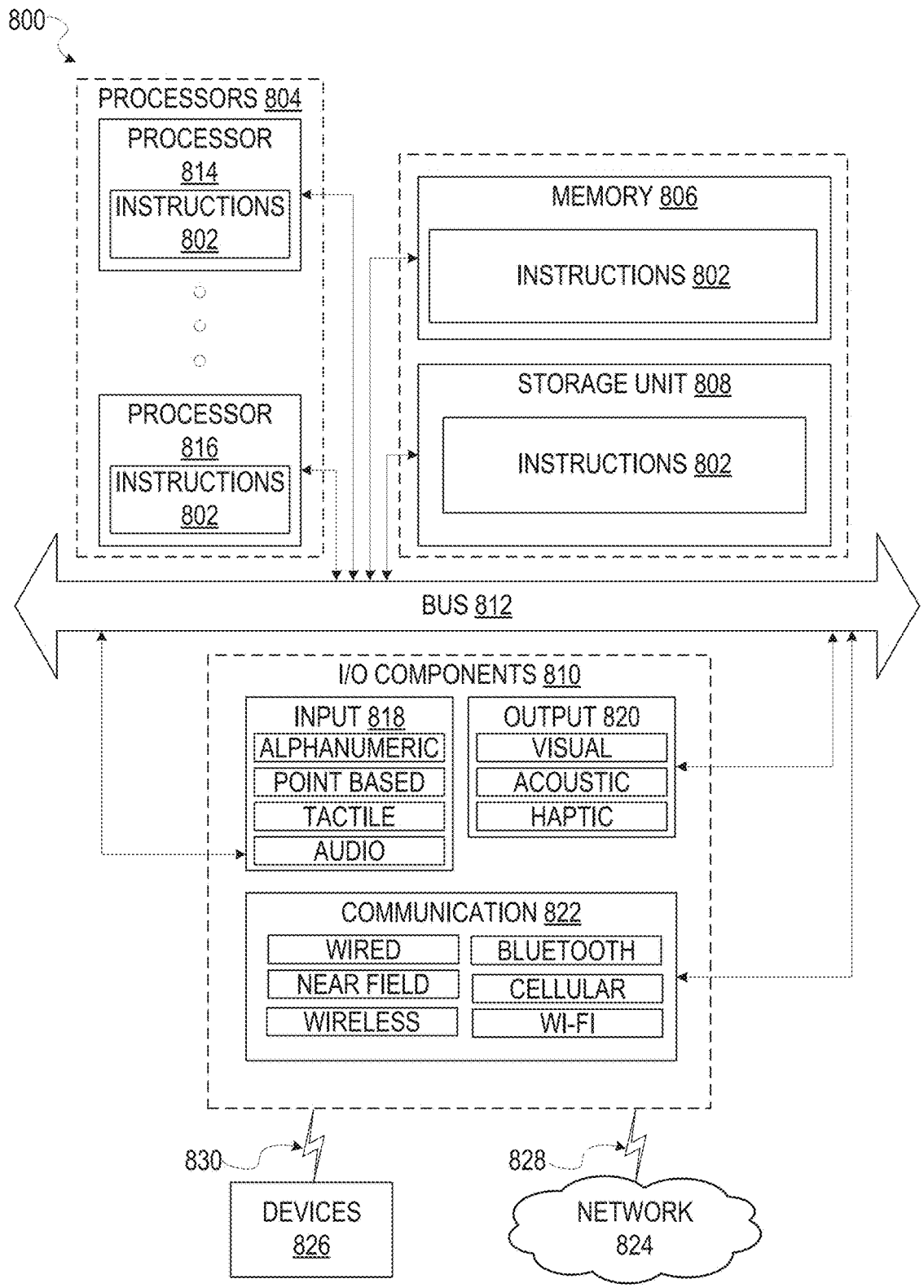
FIG. 8 shows a block diagram illustrating an example of a machine upon which one or more embodiments may be implemented

FIG. 8 shows a block diagram illustrating components of a computing device 800, according to some example embodiments, able to read instructions from a machine-readable medium (e.g., a machine-readable storage medium) and perform any one or more of the methodologies discussed herein. Specifically, FIG. 8 shows a diagrammatic representation of computing device 800 in the example form of a system, within which instructions 802 (e.g., software, a program, an application, an applet, an app, a driver, or other executable code) for causing computing device 800 to perform any one or more of the methodologies discussed herein may be executed. For example, instructions 802 include executable code that causes computing device 800 to execute methods 400, 500 and 600. In this way, these instructions transform the general, non-programmed machine into a particular machine programmed to carry out the described and illustrated functions in the manner described herein. Computing device 800 may operate as a standalone device or may be coupled (e.g., networked) to other machines.

By way of non-limiting example, computing device 800 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 802, sequentially or otherwise, that specify actions to be taken by computing device 800. Further, while only a single computing device 800 is illustrated, the term "machine" shall also be taken to include a collection of computing devices 800 that individually or jointly execute instructions 802 to perform any one or more of the methodologies discussed herein.

Computing device 800 may include processors 804, memory 806, storage unit 808 and I/O components 810, which may be configured to communicate with each other such as via bus 812. In an example embodiment, processors 804 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 814 and processor 816 that may execute instructions 802. The term "processor" is intended to include multi-core processors that may comprise two or more independent processors (sometimes referred to as "cores") that may execute instructions contemporaneously. Although FIG. 8 shows multiple processors, computing device 800 may include a single processor with a single core, a single processor with multiple cores (e.g., a multi-core process), multiple processors with a single core, multiple processors with multiples cores, or any combination thereof.

Memory 806 (e.g., a main memory or other memory storage) and storage unit 808 are both accessible to processors 804 such as via bus 812. Memory 806 and storage unit 808 store instructions 802 embodying any one or more of the methodologies or functions described herein. In some embodiments, database 816 resides on storage unit 808. Instructions 802 may also reside, completely or partially, within memory 806, within storage unit 808, within at least one of processors 804 (e.g., within the processor's cache memory), or any suitable combination thereof, during execution thereof by computing device 800. Accordingly, memory 806, storage unit 808, and the memory of processors 804 are examples of machine-readable media.

As used herein. "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 802. The term "machine-readable medium" shall also be taken to include any medium, or combination of multiple media, that is capable of storing instructions (e.g., instructions 802) for execution by a machine (e.g., computing device 800), such that the instructions, when executed by one or more processors of computing device 800 (e.g., processors 804), cause computing device 800 to perform any one or more of the methodologies described herein (e.g., methods 400, 500 and 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 810 may include a wide variety of components to receive input, provide output, produce output, transmit information, exchange information, capture measurements, and so on. The specific I/O components 810 that are included in a particular machine will depend on the type of machine. For example, portable machines such as mobile phones will likely include a touch input device or other such input mechanisms, while a headless server machine will likely not include such a touch input device. It will be appreciated that I/O components 810 may include many other components that are not specifically shown in FIG. 8. I/O components 810 are grouped according to functionality merely for simplifying the following discussion and the grouping is in no way limiting. In various example embodiments, I/O components 810 may include input components 818 and output components 820. Input components 818 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 820 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 810 may include communication components 822 operable to couple computing device 800 to network 824 or devices 826 via coupling 828 and coupling 830, respectively. For example, communication components 822 may include a network interface component or other suitable device to interface with network 824. In further examples, communication components 822 may include wired communication components, wireless communication components, cellular communication components, near field communication (NFC) components. Bluetooth® components (e.g., Bluetooth® Low Energy), Wi-Fi® components, and other communication components to provide communication via other modalities. The devices 826 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
receiving, from a client device, a request to generate a verified data set;
in response to receiving the request:
accessing available verified data for a user associated with the client device, and causing presentation of a listing of the available verified data for the user on the client device;
receiving, from the client device, a selection of a subset of the available verified data for the user that is to be included in the verified data set;
generating, by one or more computer processors, the verified data set based on the subset of the available verified data for the user;
generating a unique identifier for the verified data set; and
providing, to the client device, the unique identifier for the verified data set, the unique identifier enabling access of the verified data set; and
receiving, from the client device, a second request to generate a second verified data set;
in response to receiving the second request:
accessing the available verified data for the user associated with the client device, and causing presentation of the listing of the available verified data for the user on the client device;
receiving, from the client device, a selection of a second subset of the available verified data for the user that is to be included in the second verified data set, the second subset of the available verified data being different than the subset of the available verified data;
generating the second verified data set based on the second subset of the available verified data for the user;
generating a second unique identifier for the second verified data set; and
providing, to the client device, the second unique identifier for the second verified data set, the second unique identifier enabling access of the second verified data set.

2. The method of claim 1, further comprising:
receiving login credentials to access an account of the user on a trusted web service;
accessing, using the login credentials, the account of the user on the trusted web service; and
after accessing the account, retrieving at least a portion of the available verified data for the user from the trusted web service.

3. The method of claim 1, further comprising:
receiving personal data from the user;
submitting a background check based on the personal data; and
receiving confirmation that the personal data is valid, yielding at least a portion of the of the available verified data for the user.

4. The method of claim 1, wherein generating the verified data set based on the subset of the available verified data for the user comprises:
determining, for a first data value included in the subset of the available verified data for the user, a representative data range, the representative data range being included in the verified data set to represent the first data value.

5. The method of claim 1, wherein generating the verified data set based on the subset of the available verified data for the user comprises:
determining, for a set of data values included in the subset of the available verified data for the user, an aggregated data value, the aggregated data value being included in the verified data set to represent the set of data values.

6. The method of claim 1, further comprising:
receiving, from a second client device, a data request including the unique identifier;
identifying, based on the unique identifier, the verified data set; and
providing the verified data set to the second client device.

7. A verified data management system comprising:
one or more computer processors; and
one or more computer-readable mediums storing instructions that, when executed by the one or more computer processors, cause the verified data management system to perform operations comprising:
receiving, from a client device, a request to generate a verified data set;
in response to receiving the request:
accessing available verified data for a user associated with the client device, and causing presentation of a listing of the available verified data for the user on the client device;
receiving, from the client device, a selection of a subset of the available verified data for the user that is to be included in the verified data set;
generating the verified data set based on the subset of the available verified data for the user;
generating a unique identifier for the verified data set; and
providing, to the client device, the unique identifier for the verified data set, the unique identifier enabling access of the verified data set; and
receiving, from the client device, a second request to generate a second verified data set;
in response to receiving the second request:
accessing the available verified data for the user associated with the client device, and causing presentation of the listing of the available verified data for the user on the client device;
receiving, from the client device, a selection of a second subset of the available verified data for the user that is to be included in the second verified data set, the second subset of the available verified data being different than the subset of the available verified data;

generating the second verified data set based on the second subset of the available verified data for the user;

generating a second unique identifier for the second verified data set; and providing, to the client device, the second unique identifier for the second verified data set, the second unique identifier enabling access of the second verified data set.

8. The verified data management system of claim 7 operations further comprising:

receiving login credentials to access an account of the user on a trusted web service;

accessing, using the login credentials, the account of the user on the trusted web service; and after accessing the account, retrieving at least a portion of the available verified data for the user from the trusted web service.

9. The verified data management system of claim 7, the operations further comprising:

receiving personal data from the user;

submitting a background check based on the personal data; and receiving confirmation that the personal data is valid, yielding at least a portion of the of the available verified data for the user.

10. The verified data management system of claim 7, wherein generating the verified data set based on the subset of the available verified data for the user comprises:

determining, for a first data value included in the subset of the available verified data for the user, a representative data range, the representative data range being included in the verified data set to represent the first data value.

11. The verified data management system of claim 7, wherein generating the verified data set based on the subset of the available verified data for the user comprises:

determining, for a set of data values included in the subset of the available verified data for the user, an aggregated data value, the aggregated data value being included in the verified data set to represent the set of data values.

12. The verified data management system of claim 7, operations further comprising:

receiving, from a second client device, a data request including the unique identifier;

identifying, based on the unique identifier, the verified data set; and providing the verified data set to the second client device.

13. The verified data management system of claim 7, the operations further comprising:

associating a mailbox with the unique identifier for the verified data set, the mailbox enabling other users with access to the unique identifier to transmit messages to the mailbox.

14. A non-transitory computer-readable medium storing instructions that, when executed by one or more computer processors of a verified data management system, cause the verified data management system to perform operations comprising:

receiving, from a client device, a request to generate a verified data set;

in response to receiving the request:

accessing available verified data for a user associated with the client device, and causing presentation of a listing of the available verified data for the user on the client device;

receiving, from the client device, a selection of a subset of the available verified data for the user that is to be included in the verified data set;

generating the verified data set based on the subset of the available verified data for the user;

generating a unique identifier for the verified data set; and providing, to the client device, the unique identifier for the verified data set, the unique identifier enabling access of the verified data set; and receiving, from the client device, a second request to generate a second verified data set, in response to receiving the second request;

accessing the available verified data for the user associated with the client device, and causing presentation of the listing of the available verified data for the user on the client device;

receiving, from the client device, a selection of a second subset of the available verified data for the user that is to be included in the second verified data set, the second subset of the available verified data being different than the subset of the available verified data;

generating the second verified data set based on the second subset of the available verified data for the user;

generating a second unique identifier for the second verified data set; and providing, to the client device, the second unique identifier for the second verified data set, the second unique identifier enabling access of the second verified data set.

15. The non-transitory computer-readable medium of claim 14, the operations further comprising:

receiving login credentials to access an account of the user on a trusted web service;

accessing, using the login credentials, the account of the user on the trusted web service; and after accessing the account, retrieving at least a portion of the available verified data for the user from the trusted web service.

16. The non-transitory computer-readable medium of claim 14, the operations further comprising:

receiving personal data from the user;

submitting a background check based on the personal data; and receiving confirmation that the personal data is valid, yielding at least a portion of the of the available verified data for the user.

17. The non-transitory computer-readable medium system of claim 14, wherein generating the verified data set based on the subset of the available verified data for the user comprises:

determining, for a first data value included in the subset of the available verified data for the user, a representative data range, the representative data range being included in the verified data set to represent the first data value.

18. The non-transitory computer-readable medium of claim 14, wherein generating the verified data set based on the subset of the available verified data for the user comprises:

determining, for a set of data values included in the subset of the available verified data for the user, an aggregated data value, the aggregated data value being included in the verified data set to represent the set of data values.

19. The non-transitory computer-readable medium of claim 14, the operations further comprising:
receiving, from a second client device, a data request including the unique identifier;
identifying, based on the unique identifier, the verified data set; and
providing the verified data set to the second client device.

\* \* \* \* \*